United States Patent
Liu et al.

(10) Patent No.: US 8,051,438 B2
(45) Date of Patent: Nov. 1, 2011

(54) METHOD FOR TRANSPORTING DISCS, DISC TRANSPORTING DEVICE AND DRAWER TYPE DISC TRANSPORTING DEVICE THEREOF

(75) Inventors: Ming-Hsun Liu, Taipei (TW); Chung-Hsuan Tsai, Taipei (TW); Chih-Sheng Liu, Taipei (TW)

(73) Assignee: Datatronics Technology, Inc., Taipei (TW)

( * ) Notice: Subject to any disclaimer, the term of this patent is extended or adjusted under 35 U.S.C. 154(b) by 320 days.

(21) Appl. No.: 12/507,837

(22) Filed: Jul. 23, 2009

(65) Prior Publication Data
US 2010/0319011 A1    Dec. 16, 2010

(30) Foreign Application Priority Data
Jun. 11, 2009   (CN) .......................... 2009 1 0145927

(51) Int. Cl.
*G11B 17/04* (2006.01)
(52) U.S. Cl. ....................................................... 720/619
(58) Field of Classification Search .................. 720/706, 720/622, 713, 704, 619, 715, 655, 610, 690, 720/624, 652, 707, 604, 702, 696, 712
See application file for complete search history.

(56) References Cited

U.S. PATENT DOCUMENTS

| | | | |
|---|---|---|---|
| 6,141,298 A | 10/2000 | Miller | |
| 6,490,232 B2 | 12/2002 | Sato | |
| 6,990,674 B1 | 1/2006 | Cummins et al. | |
| 7,216,355 B2 * | 5/2007 | Kim et al. | 720/706 |
| 7,343,610 B2 * | 3/2008 | Shibata | 720/713 |
| 7,478,412 B2 * | 1/2009 | Huh et al. | 720/706 |
| 2004/0244024 A1 * | 12/2004 | Horng et al. | 720/706 |
| 2004/0244025 A1 * | 12/2004 | Horng et al. | 720/706 |
| 2006/0031866 A1 * | 2/2006 | Kim et al. | 720/706 |
| 2006/0198252 A1 | 9/2006 | Liu et al. | |
| 2006/0209642 A1 | 9/2006 | Liu et al. | |
| 2007/0199010 A1 * | 8/2007 | Chen | 720/706 |
| 2009/0178066 A1 | 7/2009 | Liu et al. | |
| 2010/0242058 A1 * | 9/2010 | Yoon | 720/706 |

* cited by examiner

*Primary Examiner* — Allen Cao
(74) *Attorney, Agent, or Firm* — Alan Kamrath; Kamrath & Associates PA

(57) ABSTRACT

A method for transporting discs, A disc transporting device and a drawer type disc transporting device are disclosed. The disc transporting device comprises a lifting mechanism, a swing mechanism and a control element, wherein the lifting mechanism further comprises a clipper element, a drive element and a rotational connection element, the swing mechanism further comprises a corresponding connection element and a swing rotation element. The clipper element can grab at least one disc. The drive element is coupled with the clipper element and drives the lifting mechanism. The rotational connection element engages with the drive element; the corresponding connection element of the swing mechanism corresponds to the rotational connection element to enable the lifting mechanism going up/down along the swing mechanism. The control element engages with the swing rotation element of the swing mechanism to control the swing mechanism. Hence, the clipper element of the lifting mechanism grabs the disc and the drive element drives the lifting mechanism to go up and down. The control element controls the swing mechanism to swing the lifting mechanism. The lifting mechanism for holding the disc can go up/down. The grabbed disc is swung back and forth controlled by the swing mechanism.

20 Claims, 15 Drawing Sheets

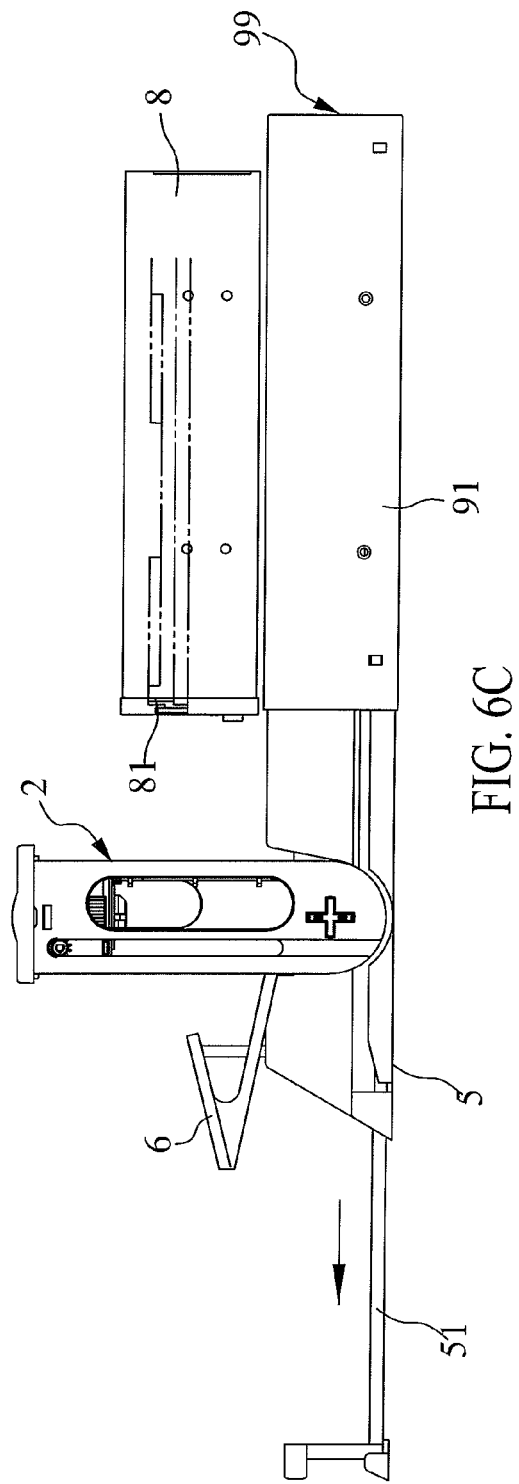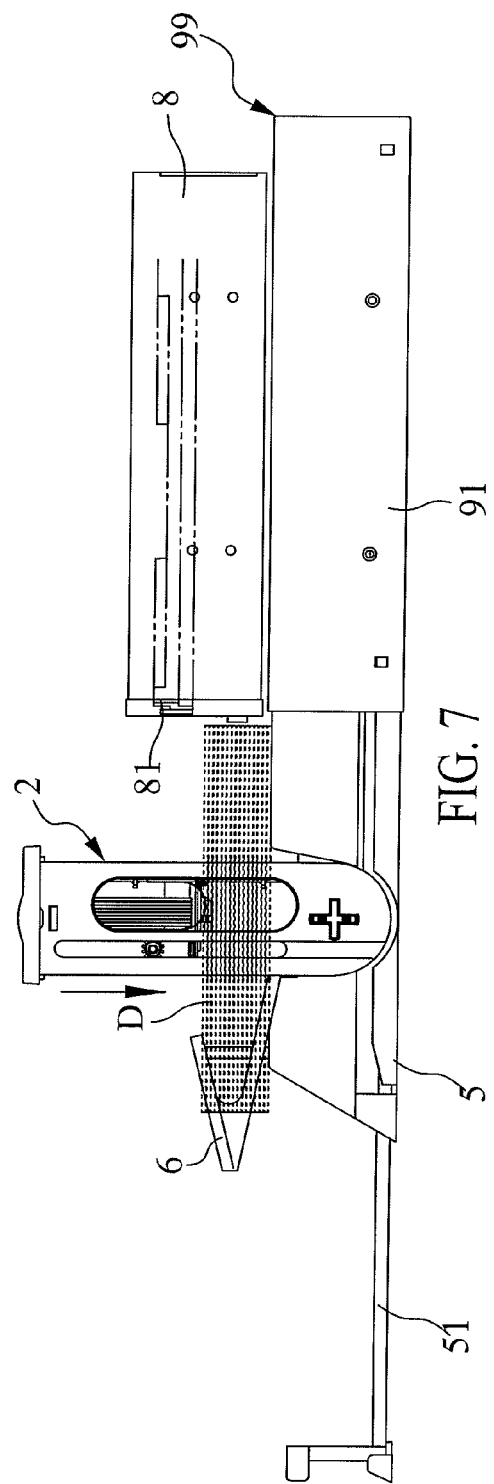

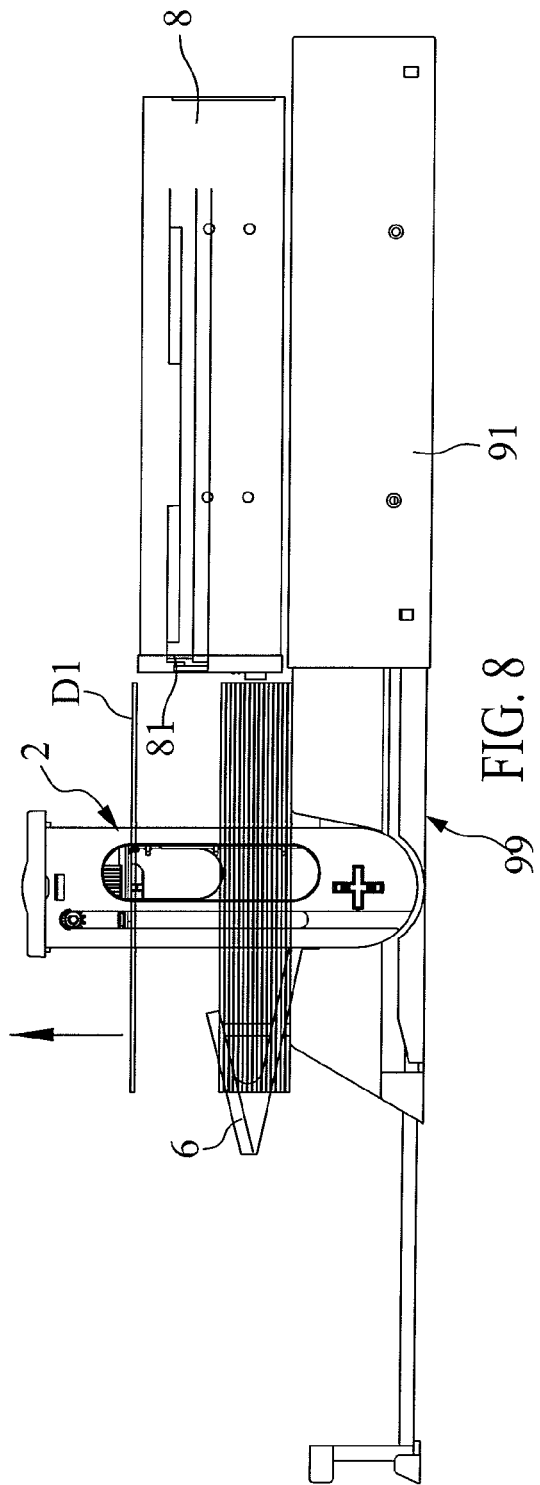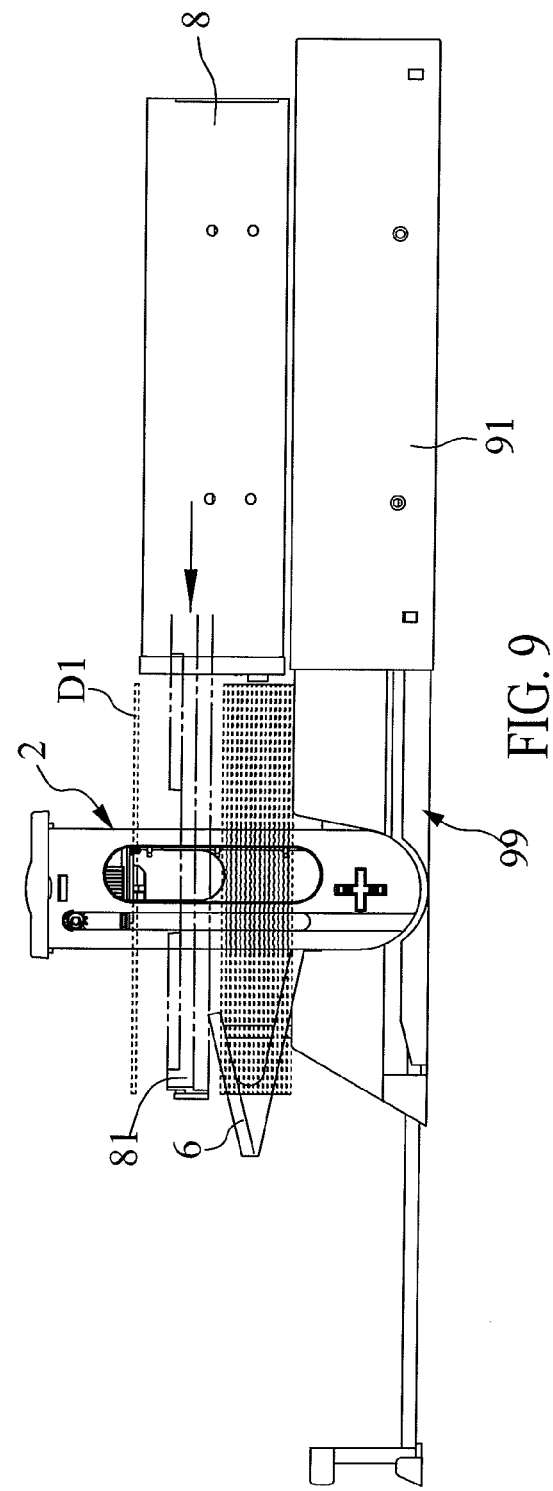

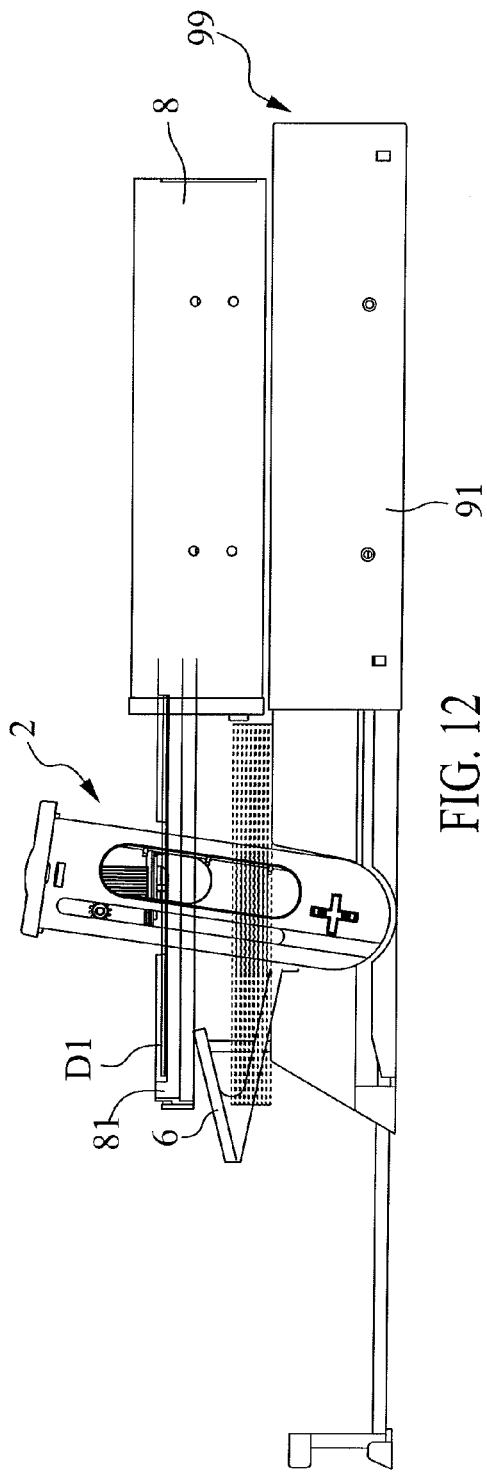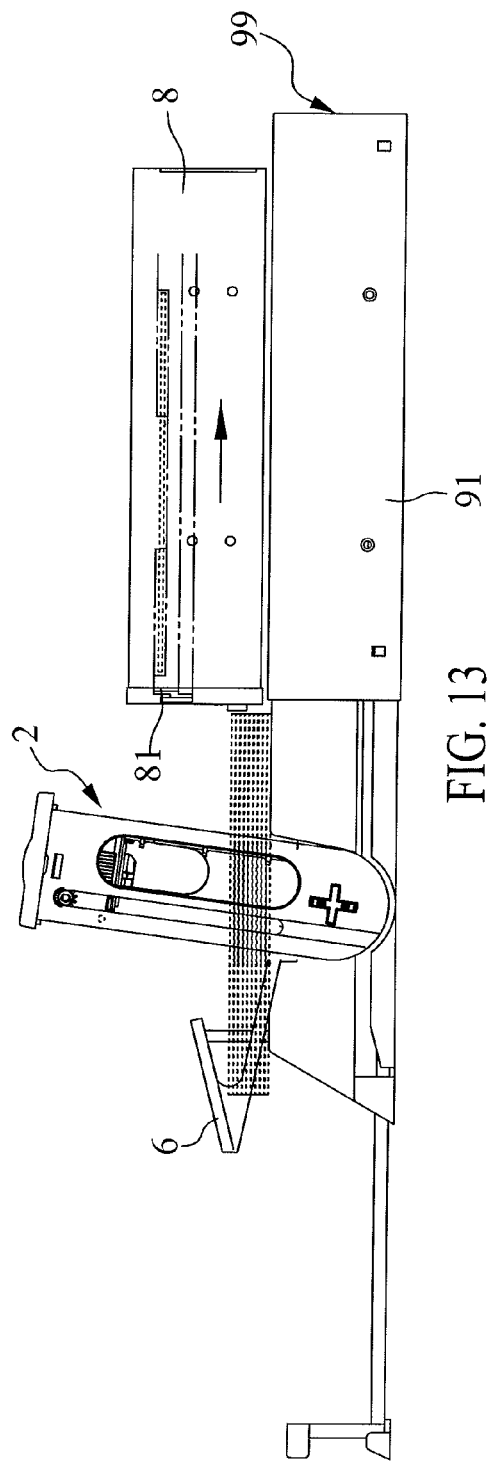

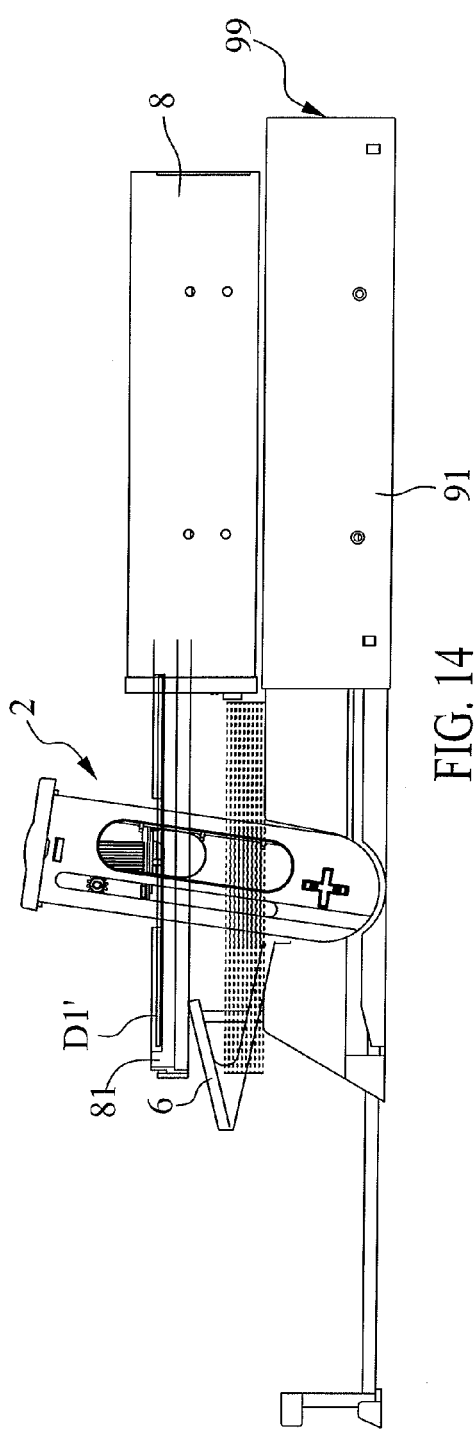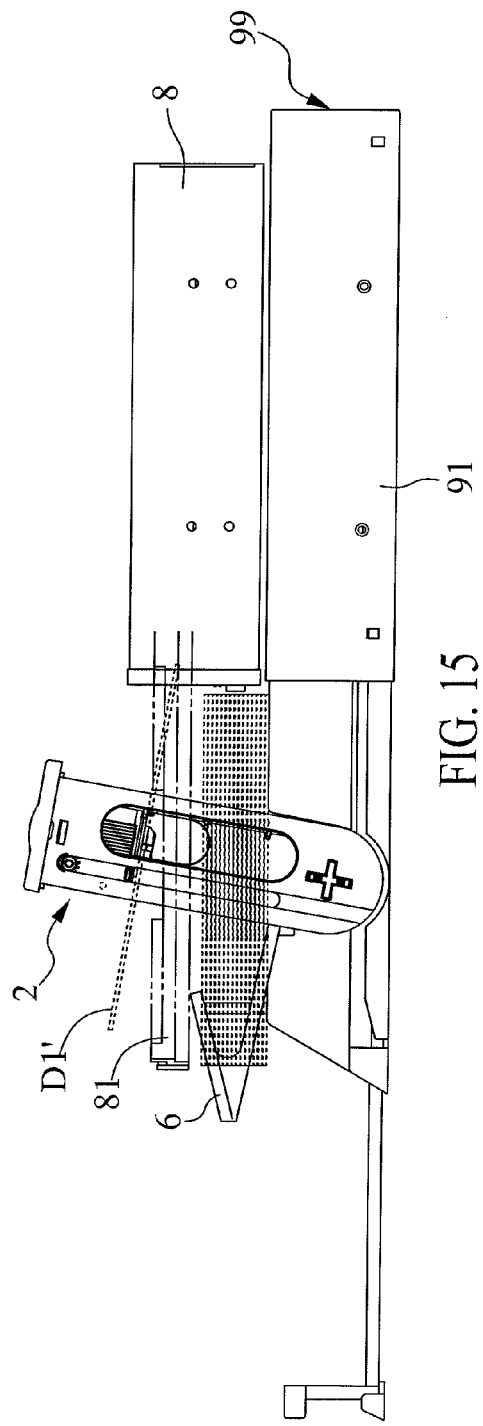

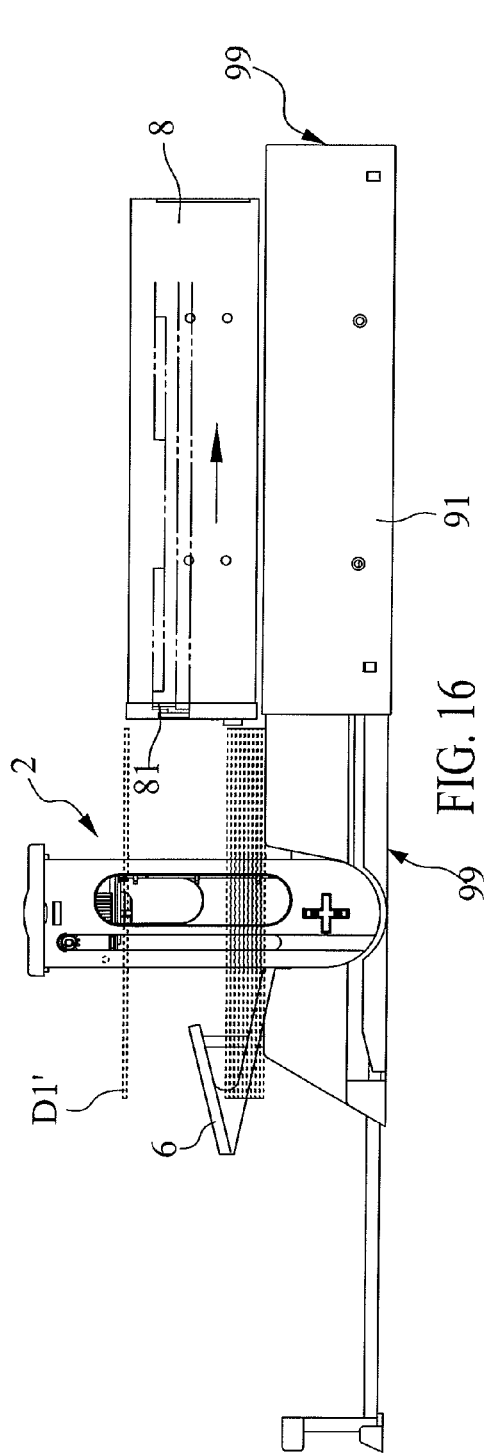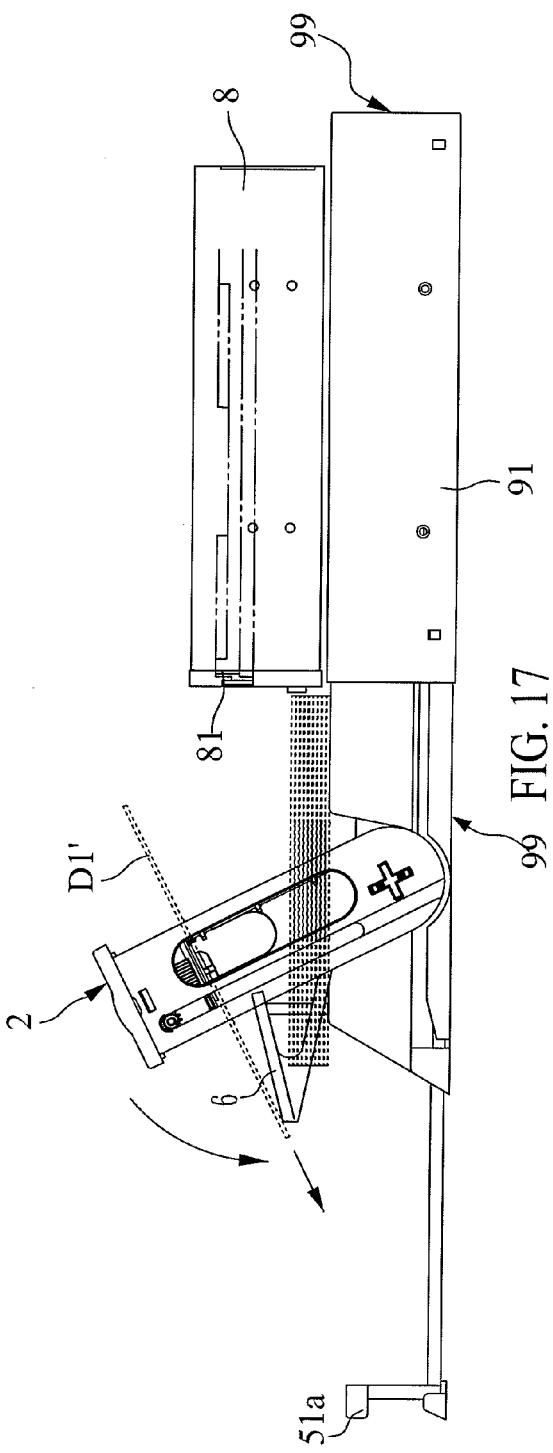

METHOD FOR TRANSPORTING DISCS, DISC TRANSPORTING DEVICE AND DRAWER TYPE DISC TRANSPORTING DEVICE THEREOF

BACKGROUND OF THE INVENTION

1. Field of the Invention

The present invention relates to a method for transporting discs, a disc transporting device and a drawer type disc transporting device thereof.

2. Description of the Related Art

In a traditional disc handling system, its transporting device often requires more than two drive units (such as motors) to move the arm to hold the disc in various direction (such as up and down and left and right), so it tends to cost more and wastes more space.

All kinds of discs can be reproduced with a disc reproduction system, such as that disclosed in U.S. Pat. No. 6,141,298, for a reasonable amount of copies. However, the prior system requires the copy unit including a set of multiple stacked recordable disk drives for installation space and a robotic disk pickup head on the pivotal transport tower encompassed by a set of disk spindle members arranged in a symmetric semi-circular pattern around the central tower, which makes it inconvenient to transfer or to operate for discs. Besides, the assembly of this system is so complicated that causes a lot more manufacturing cost.

U.S. Pat. No. 6,490,232 discloses a disc feeder, which uses a transportation device to drive an arm to move or to rotate in order to get a disc from a holder and in order to transfer the disc to a tray which is drawn from a printer. The disc is then printed in the printer and stored in a lower holder. However, this device still requires a large installation space.

U.S. Pat. No. 6,990,674 discloses a recorder or duplicator having a pivoting picker mechanism having only one degree of freedom when driven for handling the discs for recording and stacking recorded discs. The picker mechanism picks the disc from the top of a supply stack of blank discs and places the disc on a loading tray of a recorder. However, the picker mechanism of this prior art requires a larger space to pivot the picker mechanism.

Therefore, it is necessary to provide a disc transporting device and a drawer type disc transporting device to solve the above problems.

SUMMARY OF THE INVENTION

It is an object of the present invention to provide a method for transporting discs and a small size disc transporting device and a drawer type disc transporting device thereof.

The modern DVD or CD disc drive doesn't need to have its disc tray protruded out of the case completely to load the disc; therefore, it is another object of the present invention to provide a disc transporting device and a drawer type disc transporting device which can swing to slip or position the disc into the disc tray.

In order to achieve the above object, an embodiment of the present invention discloses a disc transporting device, which comprises a lifting mechanism, a swing mechanism and a control element. The lifting mechanism further comprises a clipper element, a drive element and a rotational connection element, and the swing mechanism further comprises a corresponding connection element and a swing rotation element.

The clipper element in the present invention can grab at least one disc. The drive element is pivoted with the clipper element, and the drive element drives the lifting mechanism. The rotational connection element engages with the drive element; the corresponding connection element of the swing mechanism corresponds to the rotational connection element for the lifting mechanism going up/down along the swing mechanism. The control element engages with the swing rotation element of the swing mechanism to drive the swing mechanism.

Hence, the clipper element of the lifting mechanism grabs the disc and the drive element drives the lifting mechanism to go up and down. The control element also drives the swing mechanism to swing; therefore, the lifting mechanism for holding the disc can go up/down and can swing back and forth by adapting the swing mechanism.

Preferably, the rotational connection element substantially comprises a rotation engaging member and a rotation rod. The rotation engaging member is located at one end of the rotation rod and is engaged with each other. The rotation rod is engaged with the drive element of the lifting mechanism. Furthermore, the drive element comprises a drive motor and at least one drive engaging member. The at least one drive engaging member is engaged with the drive motor and is powered by the drive motor to rotate. The rotation rod is engaged with the at least one drive engaging member, so the rotation engaging member can be driven by the rotation rod when the drive motor drives. Therefore, when the drive element rotates, the lifting mechanism can go up/down along with the corresponding connection element of the swing mechanism and can swing back and forth by adapting the swing mechanism.

The corresponding connection element of the swing mechanism comprises a rack corresponding to and engaging with the rotation engaging member. Therefore, when the rotation engaging member is rotated, the lifting mechanism goes up and down along the rack.

Preferably, the swing rotation element comprises a swing rotation rod and a swing rotation engaging member, and the swing rotation rod penetrates through the swing rotation engaging member and has a cross section in a cross shape or the like. However, the cross section of the swing rotation rod is not limited to a cross shape, other shapes such as triangle or quadrangle or the like can be used to implement the rotation rod.

The control element substantially comprises at least one control engaging member and a control motor, the control engaging member is engaged with the control motor. The control engaging member engages with the rotation engaging member to be driven by the control motor and to drive the swing mechanism to swing back and forth.

Preferably, the control element further comprises a housing. The housing covers the control engaging member and the control motor. The housing further includes a concave plane (such as being on the upper surface of the housing) for placing the at least one disc.

Additionally, another embodiment of the present invention provides a drawer type disc transporting device. In the above embodiment, the swing mechanism can be pivoted along the rotation rod (a horizontal rod); therefore, the drawer type disc transporting device further comprises a case, for the swing mechanism to be rotatably taken into the case. Also, the lifting mechanism and the control element can be taken into the case. The drawer type disc transporting device can be further miniaturized with a more compact appearance. Furthermore, the drawer type disc transporting device can be placed in a PC's slot (such as prepared for installing the CD or DVD player or the like).

In addition to the embodiment of the disc transporting device described above, the drawer type disc transporting device further comprises a disc slipping tray pivotally connected to the housing, so the disc slipping tray can rotate around a pivot. Besides, the embodiment of the drawer type disc transporting device further comprises a base and a retainer element, and the base is disposed under the control element to support the control element. The retainer element extends from the base; hence, the at least one grabbed disc can slip from the disc slipping tray to the retainer element when the least one grabbed disc is released from a clipper head. Preferably, the retainer element comprises at least one rotating pole, when the lifting mechanism and the control element are taken into the case, the rotating pole is rotated to lie transversely and is taken into the case, along with the base and the retainer element.

In this embodiment, the drawer type disc transporting device further comprises a cover plate and a handle. The handle is rotatably disposed on the cover plate to help the user pull out the disc transporting device. The cover plate is fixed on the swing mechanism. When the swing mechanism is taken into the case, the cover plate covers one side of the case to provide a more compact appearance.

BRIEF DESCRIPTION OF THE DRAWINGS

FIG. 6 to FIG. 18 illustrate 3D operation views of the drawer type disc transporting device in another embodiment of the present invention.

DETAILED DESCRIPTION OF THE PREFERRED EMBODIMENT

The advantages and innovative features of the invention will become more apparent from the following detailed description when taken in conjunction with the accompanying drawings.

Figure 1A:
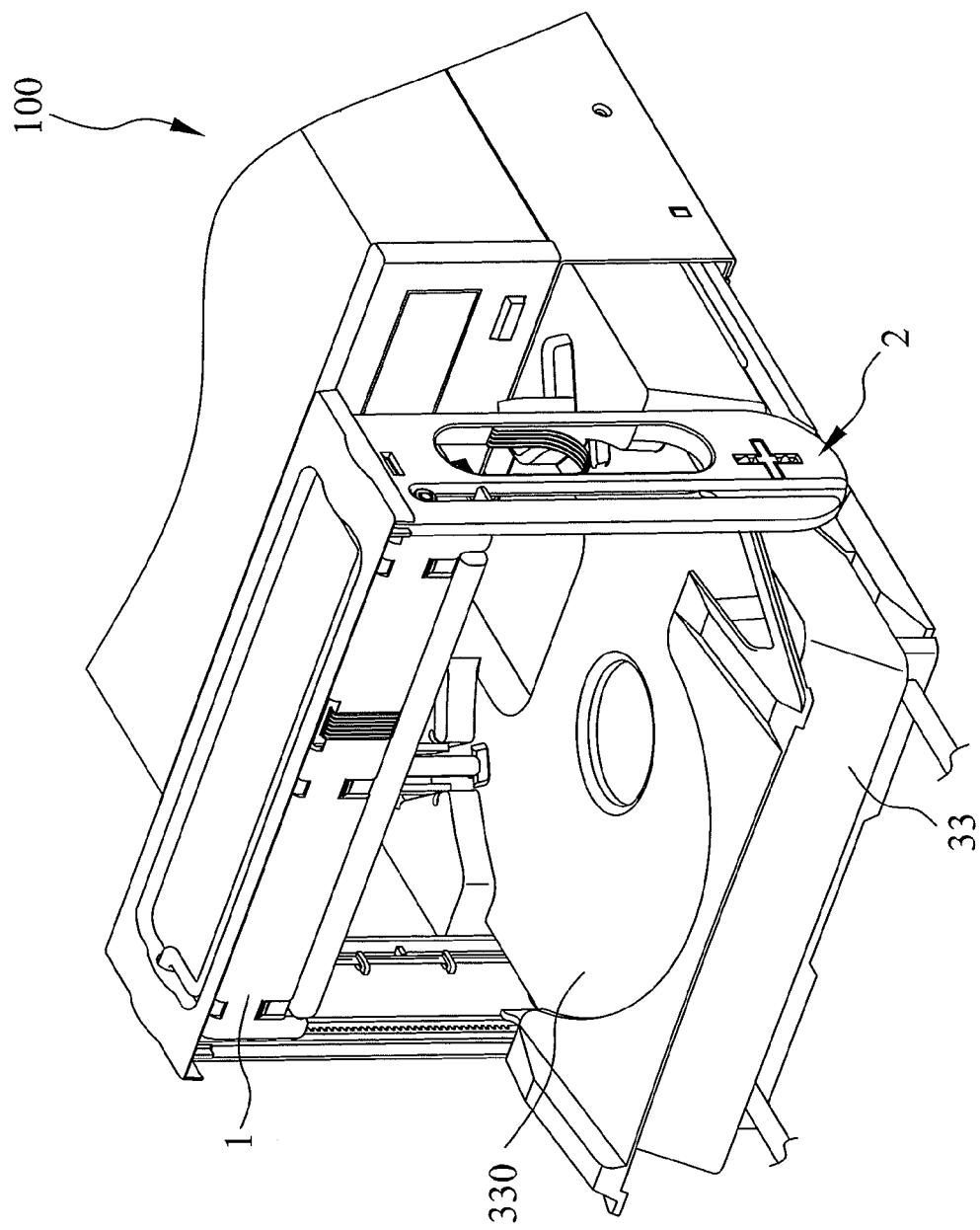
FIG. 1A illustrates a 3D view of a disc transporting device in accordance with an embodiment of the present invention.
Figure 1B:
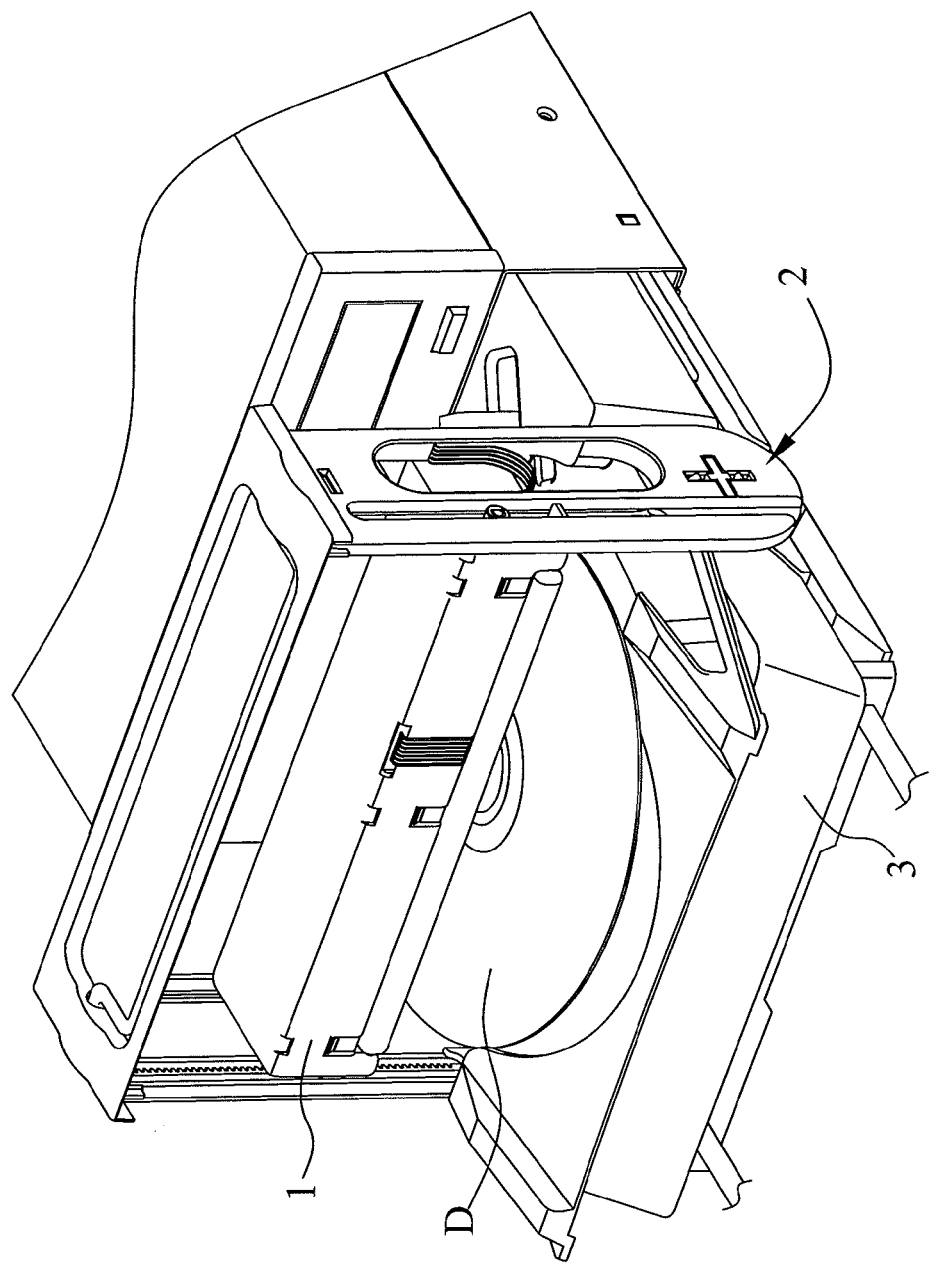
FIG. 1B illustrates a view of the disc transporting device in FIG. 1A grabbing a disc.

Please refer to FIG. 1A for a 3D view of a disc transporting device in accordance with an embodiment of the present invention. The disc transporting device 100 comprises a lifting mechanism 1, a swing mechanism 2, and a control element 3 (shown in FIG. 3). As shown in FIG. 1B, the lifting mechanism 1 of the present invention can be go up and down along the swing mechanism 2.

Figure 2:
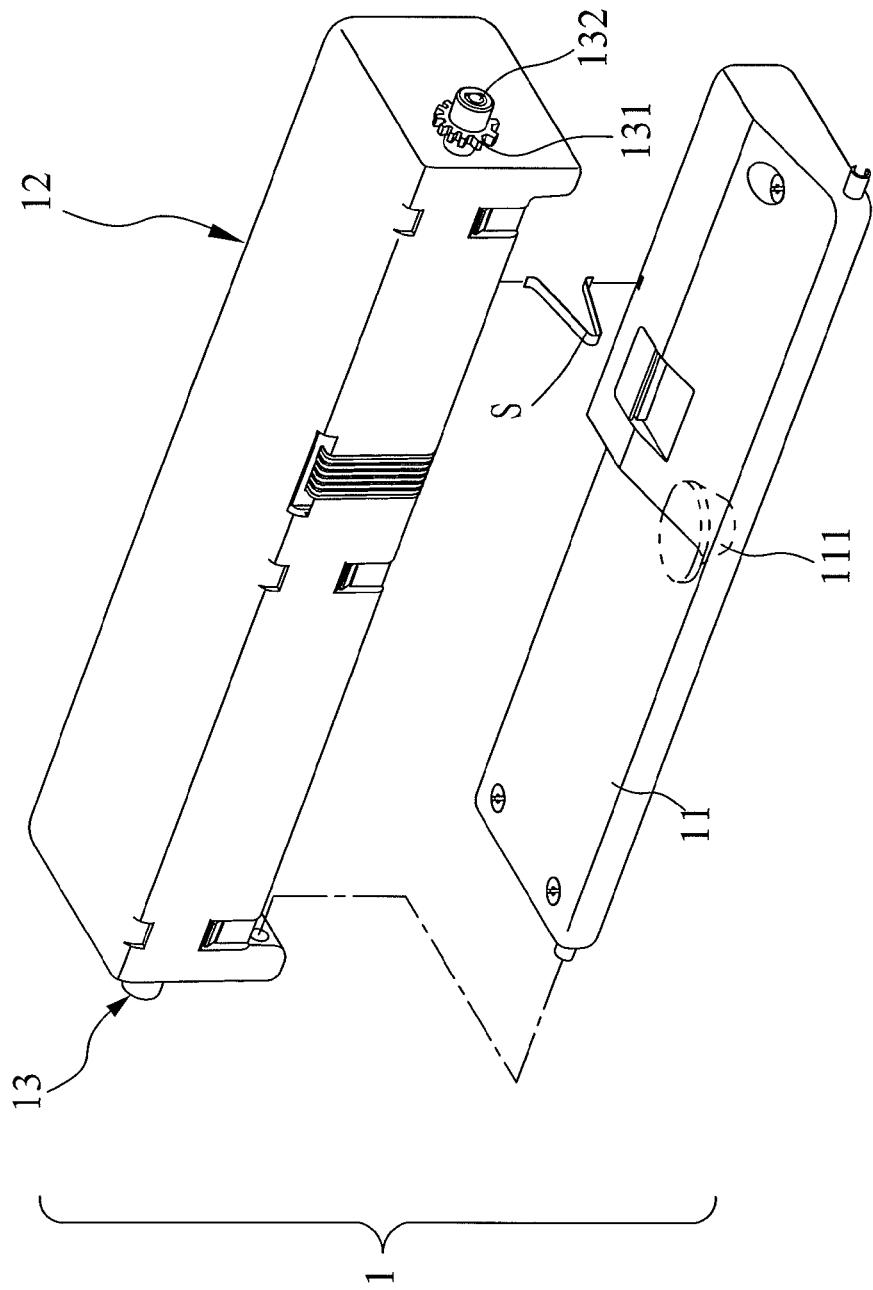
FIG. 2 illustrates a 3D view of a lifting mechanism in accordance with the present invention.
Figure 3:
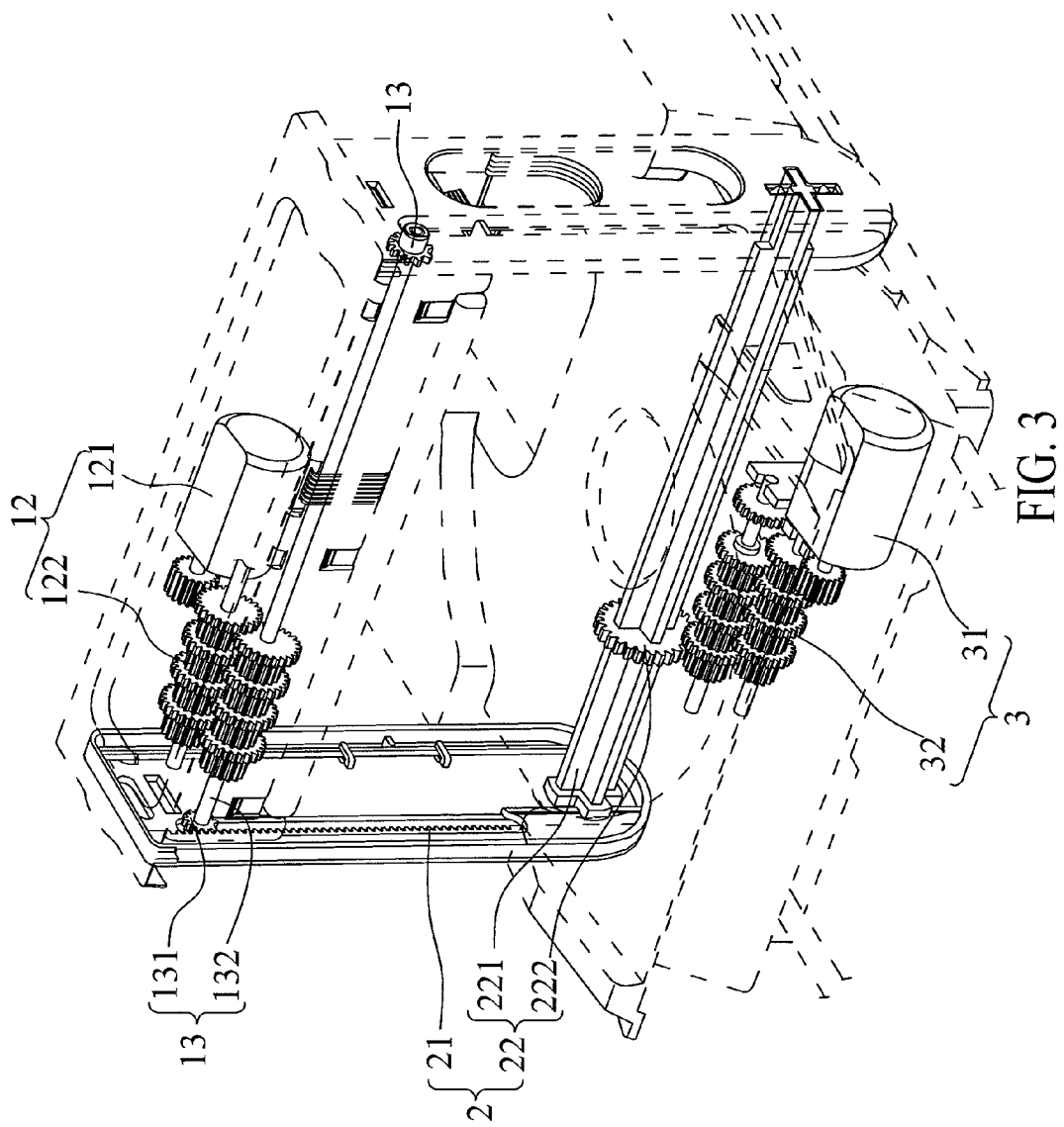
FIG. 3 illustrates partial views of the swing mechanism, the control element, and the drive element in FIG. 1.

Please refer to FIGS. 2 and 3 for details of the lifting mechanism 1, the swing mechanism 2, and the control element 3. The lifting mechanism 1 further comprises a clipper element 11, a drive element 12, and a rotational connection element 13. The drive element 12 is pivoted with the clipper element 11. The drive element 12 is provided for driving the lifting mechanism 1, which will be described later in detail. The clipper element 11 comprises a clipper head 111 for grabbing at least one disc. In the present invention, there are many possible implementations for the clipper element, such as those disclosed in U.S. patent application Ser. Nos. 11/161,276, 11/306,009 and 12/408,778 from the same applicant of the present invention; therefore, the method of how the clipper element grabs and controls the disc will not be further described.

Please refer to FIG. 3 for partial views of the swing mechanism 2, the control element 3 and the drive element 12. The swing mechanism 2 further comprises a corresponding connection element 21 and a swing rotation element 22. The rotational connection element 13 of the lifting mechanism 1 engages with the drive element 12, and the corresponding connection element 21 of the swing mechanism 2 corresponds to the rotational connection element 13 for the lifting mechanism 1 going up/down along the swing mechanism 2. The control element 3 engages with the swing rotation element 22 of the swing mechanism 2 to drive the swing mechanism 2.

As shown in FIG. 1A, FIG. 1B, FIG. 2 and FIG. 3, the clipper element 11 of the lifting mechanism 1 adapts the clipper head 111 to grab the disc D. The drive element 12 and the rotational connection element 13 correspond to and engage with the corresponding connection element 21 to move the lifting mechanism 1 up/down along the swing mechanism 2. Besides, the swing mechanism 2 is driven by the rotation of the control element 3 to swing the swing mechanism 2, and so to swing the lifting mechanism 1 back and forth. Therefore, the lifting mechanism 1 for grabbing the disc D can move up/down (as shown in FIG. 1B) and can swing back and forth with the swing mechanism 2, which will be further described.

It should be understood that the up/down, left/right, back and forth directions used in the present invention are for illustration only and not to limit the present invention.

Preferably, as shown in FIG. 2 and FIG. 3, the rotational connection element 13 comprises a rotation engaging member 131 (such as a gear shown in the FIGs) and a rotation rod 132. The rotation engaging member 131 is located at one end of the rotation rod 132 and is engaged with each other. The rotation rod 132 engages with the drive element 12 of the lifting mechanism 1. Furthermore, the drive element 12 comprises a drive motor 121 and at least one drive engaging member 122, the drive engaging member 122 is engaged with the drive motor 121 and is powered by the drive motor 121 to rotate. The rotation rod 132 is engaged with the drive engaging member 122 to rotate the rotation engaging member 131 of the lifting mechanism 1. Therefore, when the drive element 12 rotates, the lifting mechanism 1 goes up/down along with the corresponding connection element 21 of the swing mechanism 2. Additionally, those skilled in the art should know that the drive engaging member 122 can be implemented by a belt, a steel cable, a steel belt or the like to achieve the same objects; therefore, the embodiments shown in the figures are not to limit the present invention.

Furthermore, please refer to FIG. 3, the corresponding connection element 21 of the swing mechanism 2 substantially comprises a rack corresponding to the rotation engaging member 131 and engaging with each other. Therefore, when the rotation engaging member 131 is rotated, the lifting mechanism 1 substantially goes up and down along the rack. Those skilled in the art should know that the rack structure facilitates linear motion between the lifting mechanism 1 and the swing mechanism 2. Therefore the corresponding connection element 21 is not limited to the rack structure and can use other structures (such as guide rail) to achieve the same objectives.

As shown in FIG. 3, preferably, the swing rotation element 22 of the swing mechanism 2 comprises a swing rotation rod 221 and a swing rotation engaging member 222. The swing rotation rod 221 penetrates through the swing rotation engaging member 222 and has a cross section in a cross shape. However, the cross section of the swing rotation rod 221 is not limited to a cross shape, other shapes such as triangle or quadrangle or the like can be used to implement the swing rotation rod 221.

The control element 3 substantially comprises at least one control engaging member 32 and a control motor 31. The control engaging member 32 is engaged with the control motor 31. And, the control engaging member 32 engages with the swing rotation engaging member 222 so as to be driven by the control motor 31 and to drive the swing mechanism 2 to swing back and forth.

Preferably, the control element 3 further comprises a housing 33, please refer to FIG. 3, FIG. 1A and FIG. 1B at the same time, the housing 33 covers the control engaging member 32 and the control motor 31. The housing 33 further includes a concave plane 330, for example, the concave plane 330 is on the upper surface of the housing 33 for placing the disc D.

Figure 4:
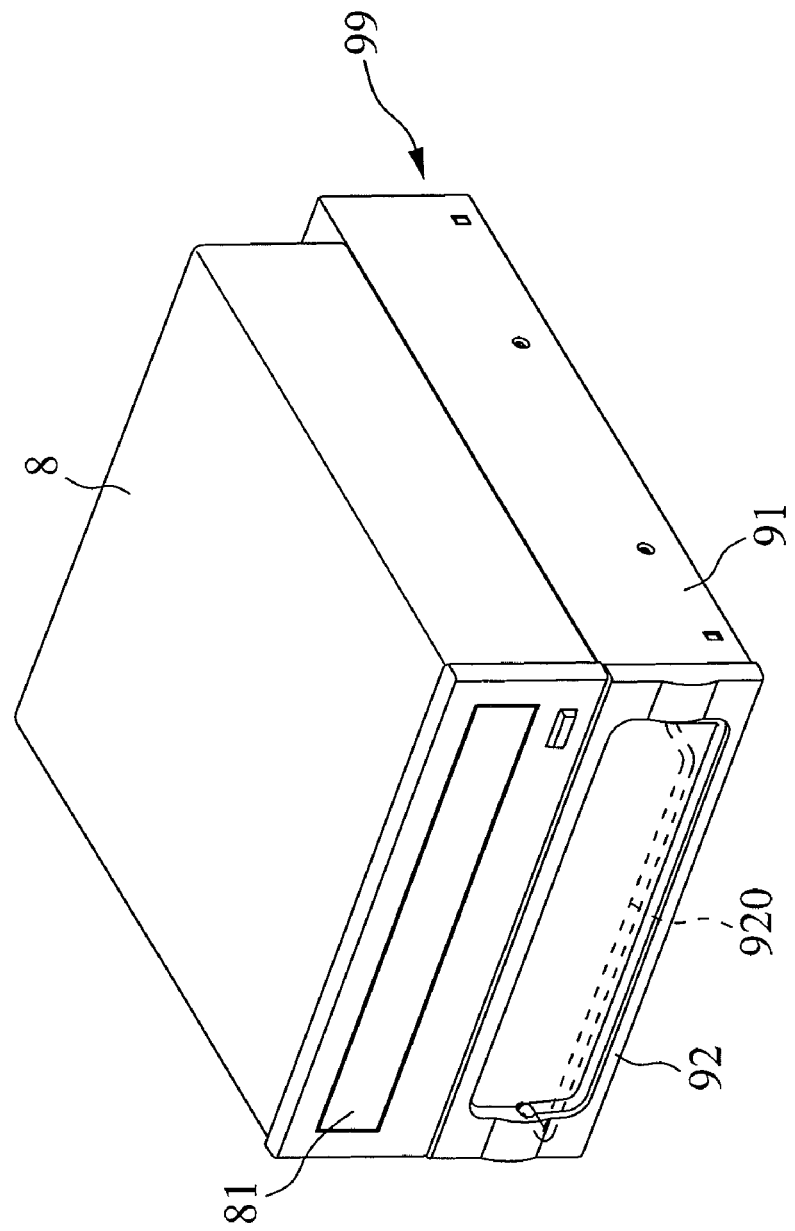
FIG. 4 illustrates a 3D view of a drawer type disc transporting device in its closed state in another embodiment of the present invention.
Figure 5:
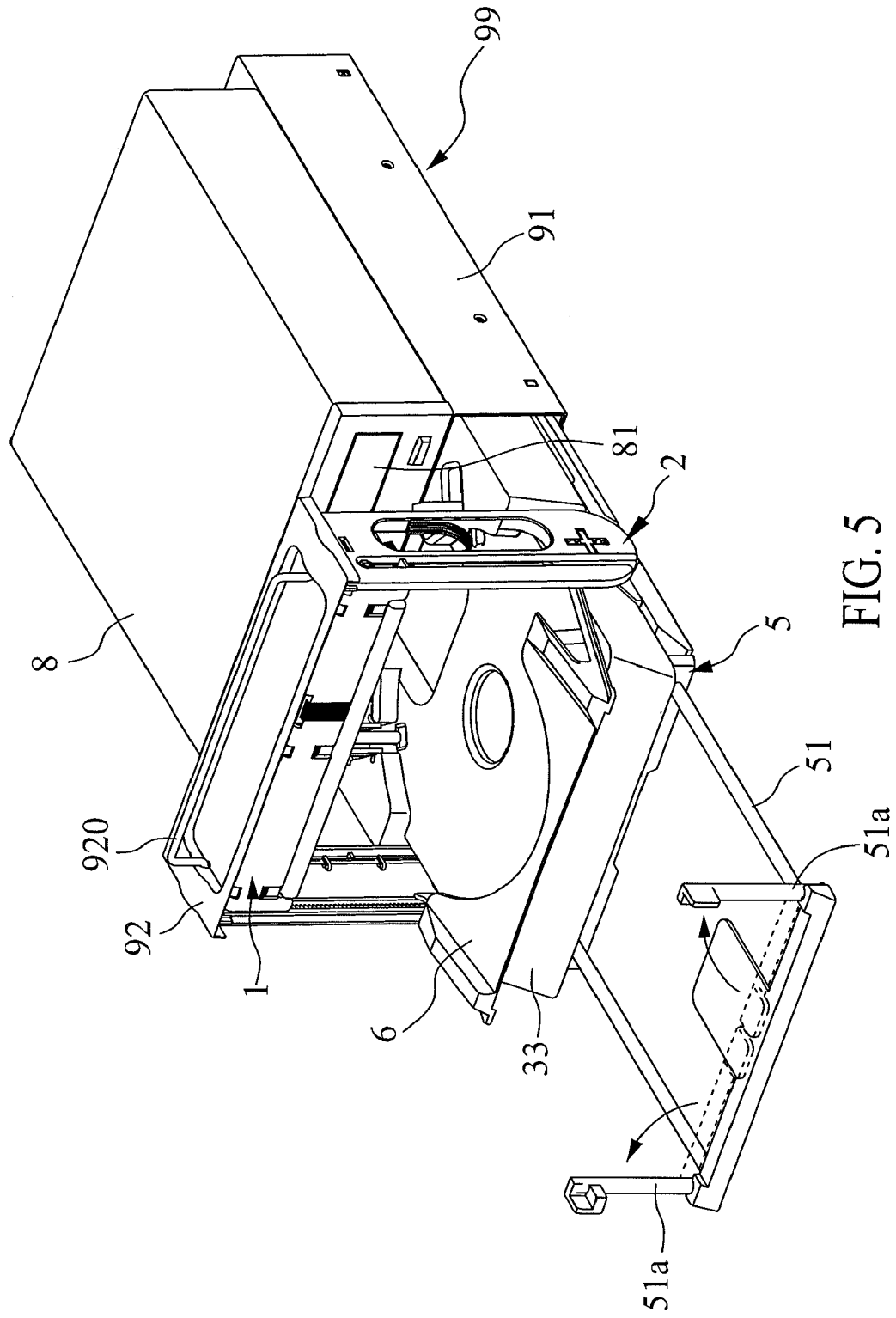
FIG. 5 illustrates a 3D view of the drawer type disc transporting device in its expanded state in another embodiment of the present invention.

Please refer to FIG. 4, another embodiment of the present invention provides a drawer type disc transporting device 99. Please also refer to FIG. 5 for an operation view of the drawer type disc transporting device 99. The disc transporting device 99 in the present invention further includes a case 91. In the embodiment shown in FIG. 1A to FIG. 3, the swing mechanism 2 can be pivoted along the rotation rod (a horizontal rod); hence, the swing mechanism 2 is rotatably taken into the case 91. And, the lifting mechanism 1 and the control element 3 can also be taken into the case 91. With this implementation, the drawer type disc transporting device 99 can be further miniaturized with a more compact appearance.

In this embodiment, the drawer type disc transporting device 99 further comprises a cover plate 92 and a handle 920. The handle 920 is rotatably disposed on the cover plate 92 to help the user pull out the disc transporting device. The cover plate 92 is fixed on the swing mechanism 2. When the swing mechanism 2 is taken into the case 91, the cover plate 92 covers one side of the case 91 to provide a more compact appearance, as shown in FIG. 4.

In addition to the embodiment of the disc transporting device described above, as shown in FIG. 5, the drawer type disc transporting device 99 further comprises a disc slipping tray 6 pivotally connected to the housing 33, so the disc slipping tray 6 can rotate around a pivot (not shown in figure) when taken into the case 91. Besides, the drawer type disc transporting device 99 further comprises a base 5 and a retainer element 51. The base 5 is disposed under the control element 3 to support the control element 3. The retainer element 51 extends from the base 5; hence, the grabbed disc can slip from the disc slipping tray 6 to be stopping at the retainer element 51 (which will be described in further detail). Preferably, the retainer element 51 comprises at least one rotating pole 51a. When the lifting mechanism 1, the swing mechanism 2 and the control element 3 are taken into the case 91, the rotating pole 51a is rotated to lie transversely and is taken into the case 91, along with the base 5 and the retainer element 51.

Figure 6A:
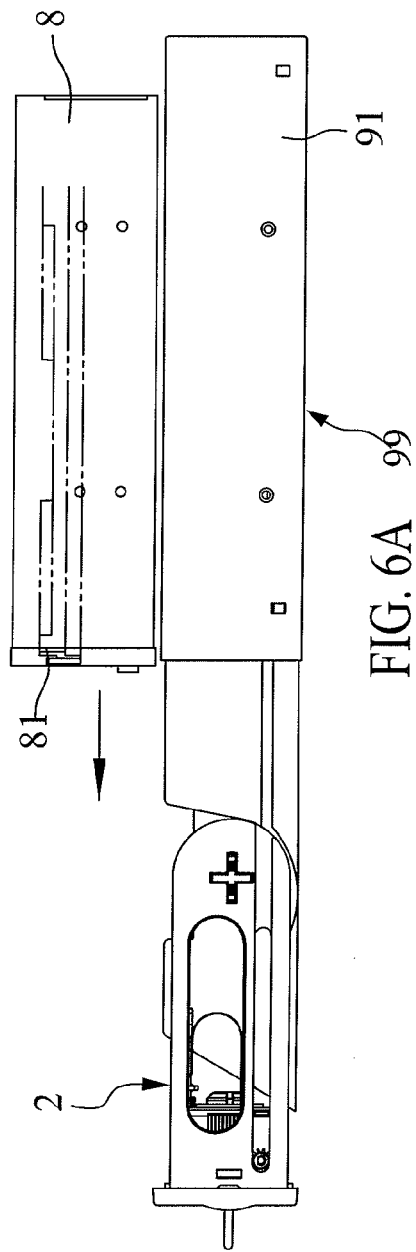

Please refer to FIG. 6A, in the present invention, the drawer type disc transporting device 99 is disposed under the disc drive 8 (and also shown in FIG. 4). Furthermore, the drawer type disc transporting device 99 can be placed in a PC's slot (such as a prepared slot for placing the CD or DVD player or the like). However, the drawer type disc transporting device 99 can be disposed at anywhere else.

Figure 6B:
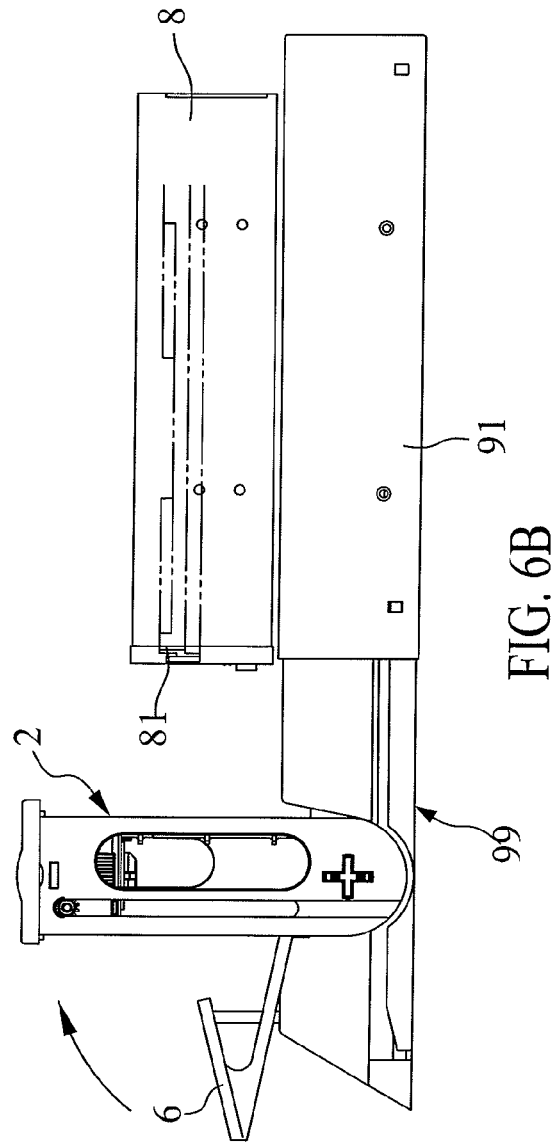

As shown in FIG. 6A, when in use, the swing mechanism 2 is pulled out from the case 91 first, then the swing mechanism 2 is erected, and the disc slipping tray 6 is pivoted with positioning, as shown in FIG. 6B. And, then the retainer element 51 is pulled out from the base 5 as that shown in FIG. 6C.

As shown in FIG. 7, the disc D is placed on the concave plane 330 of the housing 33. A sensor (not shown in figure) may be used for activating the drive motor 121 of the lifting mechanism 1 to rotate the drive engaging member 122, as shown in FIG. 3. And then, the lifting mechanism 1 goes down along the swing mechanism 2 to the place where the disc D is.

Then in FIG. 8, the clipper head 111 of the lifting mechanism 1 grabs a disc D1 and then goes up with the lifting mechanism 1. Thereafter, as shown in FIG. 9, the tray 81 of the disc drive 8 protrudes preparing to load the disc D1.

Figure 10:
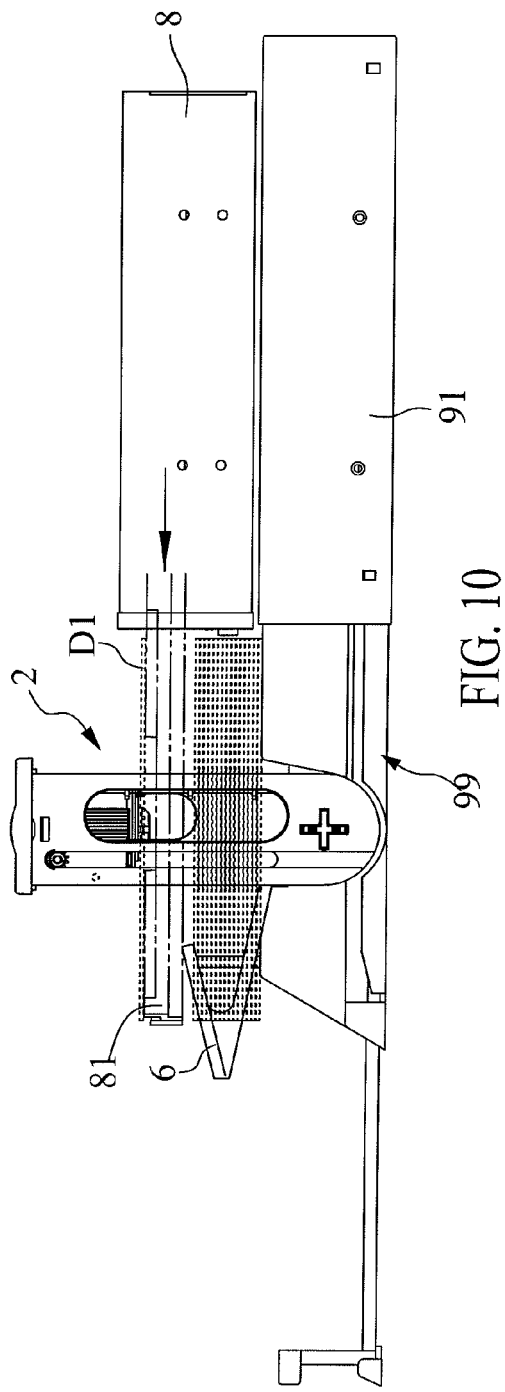
Figure 11:
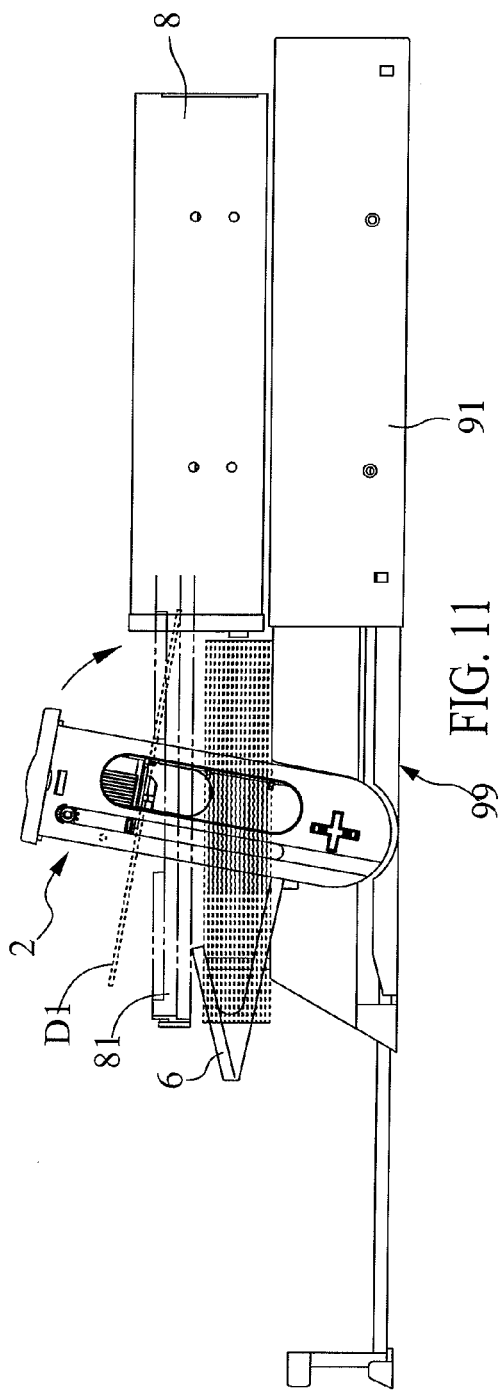

Please refer to FIG. 10, which shows that the lifting mechanism 1 brings the grabbed disc D1 to a top edge of the tray 81 by sensing with "touch". Then, as shown in FIG. 11, which shows one of the characteristics of the present invention in that the swing mechanism 2 can enable the swing mechanism 2 to swing the lifting mechanism 1. As described in above with referring to FIG. 2 and FIG. 3, the sensor (not shown in figure) is used for activating the control motor 31 of the control element 3 so as to rotate the swing rotation element 22, and then the swing mechanism 2 and the lifting mechanism 1 are swung forth (as shown in FIG. 1). When the swing mechanism 2 is swung, the lifting mechanism 1 can enable the disc D1 to be slopped. Therefore, the disc D1 can have a largest movement in horizontal direction.

Again, the lifting mechanism 1 is going down a little bit so as to make the disc D1 being closely onto the tray 81, as shown in FIG. 12. Meanwhile, referring to FIG. 2 since the clipper element 11 and the drive element 12 are pivoted with each other, the clipper element 11 can be rotated along the pivot when the lifting mechanism 1 is going down again. In addition, a spring S disposed between the drive element 12 and the clipper element 11 can provide resilience to avoid the clipper element 11 being rotated too much and to enable the disc D1 grabbed by the clipper element 11 being positioned without an angel, as shown in FIG. 12.

Even if the tray 81 of the disc drive 8 does not protrude out of the case 91 completely, the disc D1 can still smoothly slip into the tray 81 of the disc drive 8 since the swing mechanism 2 tilts the lifting mechanism 1 which grabs the disc D1.

Then, as shown in FIG. 13, the clipper element 11 releases the disc D1 and goes up, and the tray 81 of the disc drive 8 returns into the case 91 with the disc D1 for further processing (such as cloning or printing).

After processing the disc D1, as shown in FIG. 14, again, the tray 81 protrudes out of the disc drive 8 with a processed disc D1'. The swing mechanism 2 still remains the same tilted angle, and the clipper element 11 of the lifting mechanism 1 goes down further for grabbing the processed disc D1'. FIG. 14 is similar with FIG. 12, which shows the disc D1' grabbed by the clipper element 11 being positioned without an angel. Then, as shown in FIG. 15, the lifting mechanism 1 goes up a little bit, so the resilience provided by the spring S, as described above, can tilt again the processed disc D1'.

Thereafter, as shown in FIG. 16, the swing mechanism 2 and the lifting mechanism 1 swing backward to original position, and the tray 81 of the disc drive 8 returns back into the case 91.

And then, as shown in FIG. 17, the swing mechanism 2 and the lifting mechanism 1 swing further backward to the disc slipping tray 6 so as to allow the processed disc D1' being slipped from the disc slipping tray 6 to the rotating pole 51a.

Figure 18:
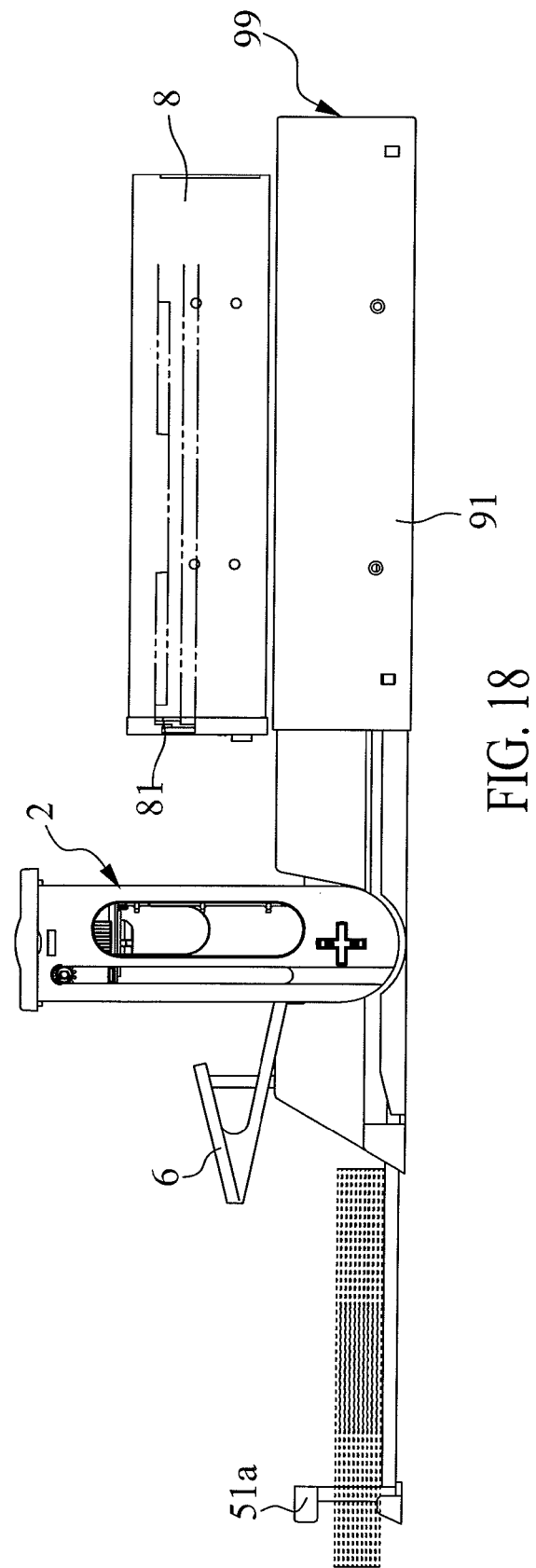

The automatic handling and collecting of discs are fulfilled by repeating the above procedures, as shown in FIG. 18.

Figure 19:
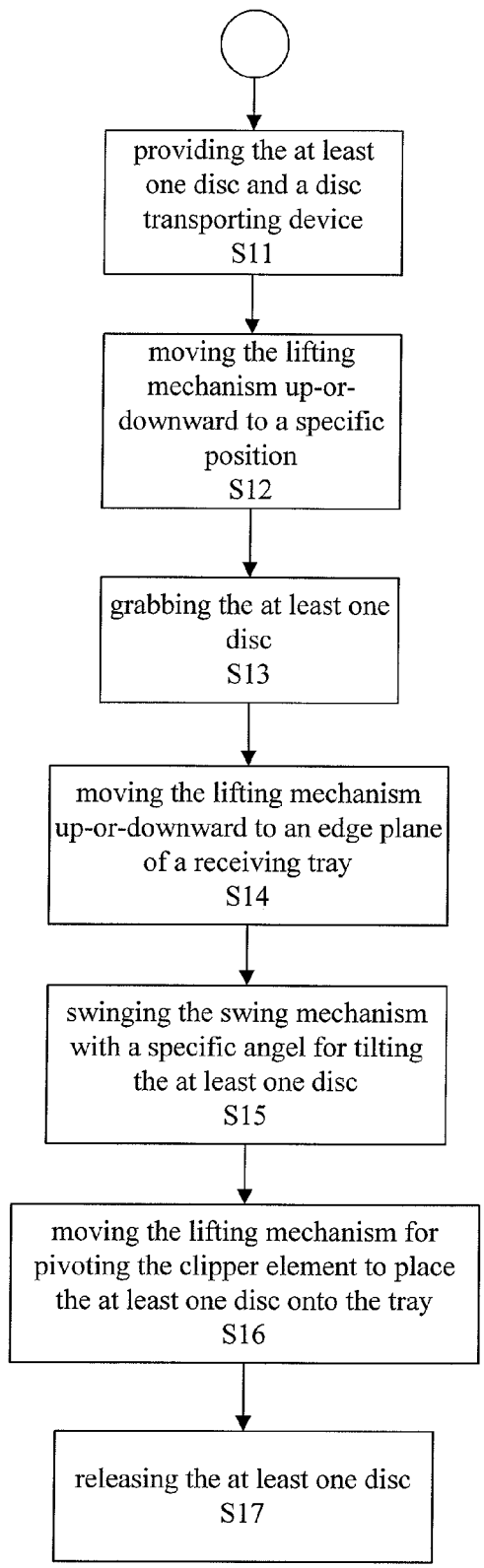
FIG. 19 is a flow chart of a method for transporting at least one disc in accordance with the present invention.

The above procedures can be programmed, so the present invention also provides a method by executing a program stored in a memory for transporting at least one disc. The method, as shown in FIG. 19 comprises S11: providing the at least one disc and a disc transporting device comprising a lifting mechanism, a swing mechanism, and a control element, wherein the lifting mechanism comprises a clipper element, a drive element pivoted with the clipper element, and a rotational connection element engaging with the drive element; S12: moving the lifting mechanism up-or-downward to a specific position driven by the drive element; S13: grabbing the at least one disc by the clipper element; S14: moving the lifting mechanism up-or-downward to an edge plane of a receiving tray; S15: swinging the swing mechanism with a specific angel controlled by the control element for tilting the at least one disc; S16: moving the lifting mechanism up-or-downward for pivoting the clipper element to place the at least one disc onto the tray; and S17: releasing the at least one disc.

According to the method of the present invention, even if the tray of the disc drive does not protrude out of the case completely, the disc can still smoothly slip into the tray of the disc drive since the lifting mechanism goes up and down, the clipper element is pivoted for positioning the disc, and the swing mechanism tilts the lifting mechanism which grabs the disc.

It is noted that the above-mentioned embodiments are only for illustration, it is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A disc transporting device comprising:
    a lifting mechanism comprising:
        a clipper element for grabbing at least one disc;
        a drive element pivoted with the clipper element, the drive element being provided for powering the lifting mechanism; and
        a rotational connection element engaging with the drive element;
    a swing mechanism comprising a corresponding connection element and a swing rotation element, wherein the corresponding connection element corresponds to the rotational connection element for the lifting mechanism going up and down along the swing mechanism; and
    a control element connecting with the swing rotation element to drive the swing mechanism;
    wherein the clipper element of the lifting mechanism grabs the at least one disc, the drive element drives the lifting mechanism to go up and down, and the swing mechanism uses the control element to swing the lifting mechanism back and forth.

2. The disc transporting device as claimed in claim 1, wherein the rotational connection element comprises a rotation engaging member and a rotation rod engaged with the drive element, and the rotation engaging member is at one end of the rotation rod and is engaged with each other.

3. The disc transporting device as claimed in claim 2, wherein the drive element comprises a drive motor and at least one drive engaging member, the at least one drive engaging member is engaged with the drive motor and is driven by the drive motor so as to control the lifting mechanism going up and down.

4. The disc transporting device as claimed in claim 3, wherein the corresponding connection element comprises a rack corresponding to the rotation engaging member; when the rotation engaging member is rotated, the lifting mechanism goes up and down along the rack.

5. The disc transporting device as claimed in claim 3, and the rotation rod is engaged with the at least one drive engaging member, and the drive motor drives the rotation rod to be rotated so as to move the lifting mechanism going up and down.

6. The disc transporting device as claimed in claim 3, wherein the swing rotation element comprises a swing rotation rod and a swing rotation engaging member, and the swing rotation rod penetrates through the swing rotation engaging member.

7. The disc transporting device as claimed in claim 6, wherein the control element comprises at least one control engaging member and a control motor, the at least one control engaging member engages with the control motor, the swing rotation engaging member is engaged with the at least one control engaging member, and the control motor drives the at least one control engaging member and the swing rotation engaging member so as to drive the swing rotation rod and the swing mechanism to swing back and forth.

8. The disc transporting device as claimed in claim 7, wherein the control element further comprises a housing, the housing covers the control engaging member and the control motor, and the housing further includes a concave plane for placing the at least one disc.

9. The disc transporting device as claimed in claim 8 further comprising a disc slipping tray, wherein the disc slipping tray is pivotally connected to the housing for the disc slipping tray to rotate.

10. The disc transporting device as claimed in claim 9 further comprising: a base and a retainer element, the base is disposed under the control element to support the control element, and the retainer element extends from the base; hence, the at least one grabbed disc can slip from the disc slipping tray to the retainer element.

11. A receivable disc transporting device comprising:
    a lifting mechanism comprising:
        a clipper element for grabbing at least one disc;
        a drive element pivoted with the clipper element, the drive element being provided for powering the lifting mechanism; and
        a rotational connection element engaging with the drive element;
    a swing mechanism comprising a corresponding connection element and a swing rotation element, wherein the corresponding connection element corresponds to the rotational connection element for the lifting mechanism going up and down along the swing mechanism; and
    a control element connecting with the swing rotation element to drive the swing mechanism; and
    a case;
    wherein the clipper element of the lifting mechanism grabs the at least one disc, the drive element drives the lifting mechanism to go up and down, and the swing mechanism uses the control element to swing the lifting mechanism back and forth;
    wherein the swing mechanism is rotatably taken into the case, along with the lifting mechanism and the control element.

12. The receivable disc transporting device as claimed in claim 11, wherein the rotational connection element comprises a rotation engaging member and a rotation rod engaged with the drive element, and the rotation engaging member is at one end of the rotation rod and is engaged with each other.

13. The receivable disc transporting device as claimed in claim 12, wherein the drive element comprises a drive motor and at least one drive engaging member, the at least one drive engaging member is engaged with the drive motor and is driven by the drive motor so as to control the lifting mechanism going up and down.

14. The receivable disc transporting device as claimed in claim 13, wherein the corresponding connection element comprises a rack corresponding to the rotation engaging member; when the rotation engaging member is rotated, the lifting mechanism goes up and down along the rack.

15. The receivable disc transporting device as claimed in claim 13, and the rotation rod is engaged with the at least one drive engaging member, and the drive motor drives the rotation rod to be rotated so as to move the lifting mechanism going up and down.

16. The receivable disc transporting device as claimed in claim 13, wherein the swing rotation element comprises a swing rotation rod and a swing rotation engaging member, and the swing rotation rod penetrates through the swing rotation engaging member.

17. The receivable disc transporting device as claimed in claim 16, wherein the control element comprises at least one control engaging member and a control motor, the at least one control engaging member engages with the control motor, the swing rotation engaging member is engaged with the at least one control engaging member, and the control motor drives the at least one control engaging member and the swing rotation engaging member so as to drive the swing rotation rod and the swing mechanism to swing back and forth.

18. The receivable disc transporting device as claimed in claim 17, wherein the control element further comprises a housing, the housing covers the control engaging member and the control motor, and the housing further includes a concave plane for placing the at least one disc.

19. The receivable disc transporting device as claimed in claim 18 further comprising a disc slipping tray, a base and a retainer element, wherein the disc slipping tray is pivotally connected to the housing for the disc slipping tray to rotate; the base is disposed under the control element to support the control element, and the retainer element extends from the base; whereby the at least one grabbed disc can slip from the disc slipping tray to the retainer element.

20. A method for transporting at least one disc, the method comprising:
providing the at least one disc and a disc transporting device comprising a lifting mechanism, a swing mechanism, and a control element, wherein the lifting mechanism comprises a clipper element, a drive element pivoted with the clipper element, and a rotational connection element engaging with the drive element;
moving the lifting mechanism up-or-downward to a specific position driven by the drive element;
grabbing the at least one disc by the clipper element;
moving the lifting mechanism up-or-downward to an edge plane of a receiving tray;
swinging the swing mechanism with a specific angel controlled by the control element for tilting the at least one disc;
moving the lifting mechanism up-or-downward for pivoting the clipper element to place the at least one disc onto the tray; and
releasing the at least one disc.

\* \* \* \* \*